UNITED STATES PATENT OFFICE.

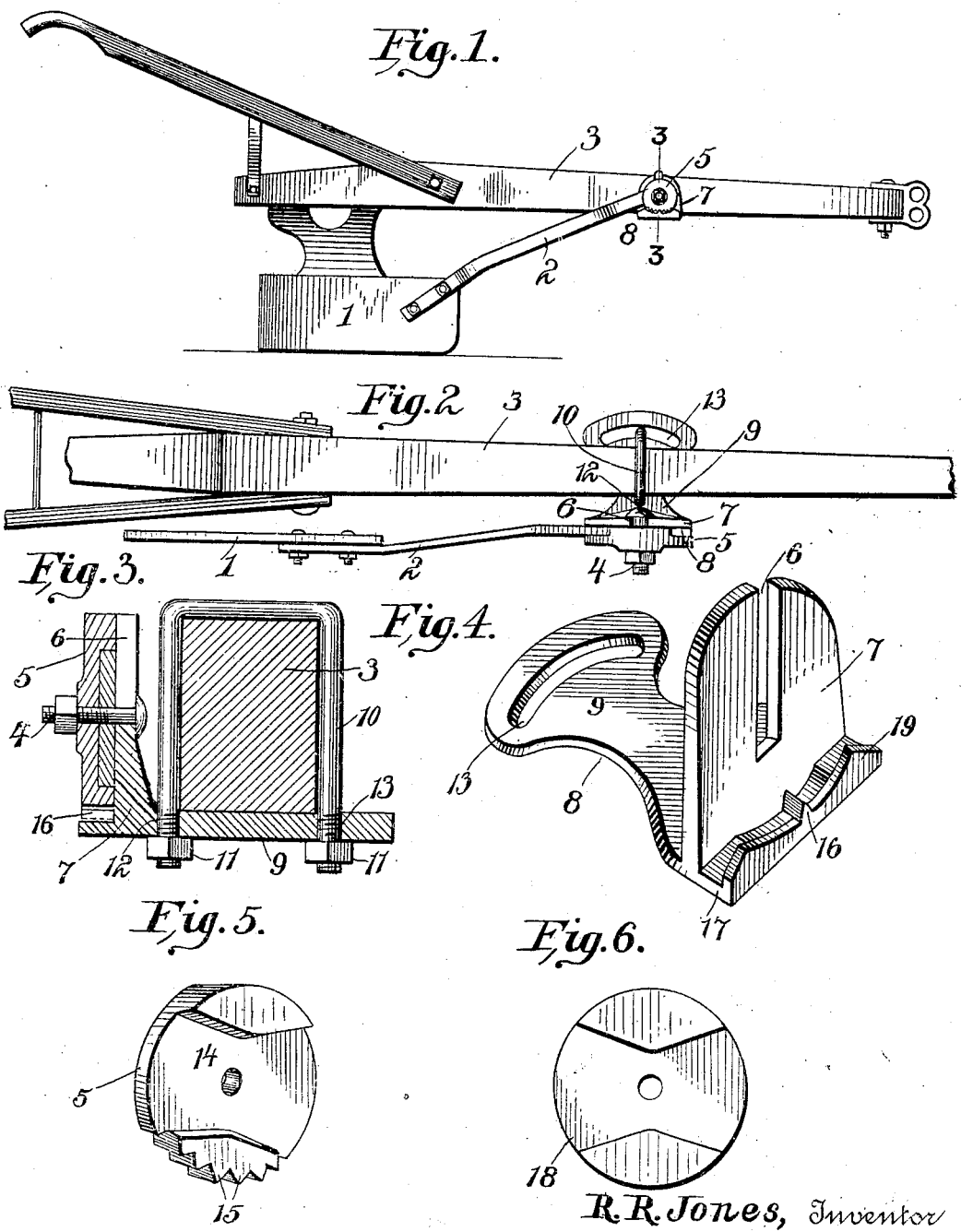

REGINALD R. JONES, OF ATLANTA, GEORGIA.

PLOW-FENDER.

No. 835,684.  Specification of Letters Patent.  Patented Nov. 13, 1906.

Application filed February 19, 1906. Serial No. 301,832.

*To all whom it may concern:*

Be it known that I, REGINALD R. JONES, a citizen of the United States, residing at Atlanta, in the county of Fulton and State of Georgia, have invented a new and useful Plow-Fender, of which the following is a specification.

The invention relates to improvements in plow-fenders.

The object of the present invention is to improve the construction of plow-fenders and to provide a simple, inexpensive, and efficient one adapted to be readily applied to a plow-beam and capable of ready adjustment longitudinally of the beam and also both vertically and laterally with relation to the plow to space it the desired distance from the same and also to permit any amount of soil to pass beneath to the plants under cultivation.

A further object of the invention is to provide a fender which will when set above the ground be adapted to permit sufficient soil to pass beneath it for covering up the grass and which will also be capable of working the clods back to the center of the furrow.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a fender constructed in accordance with this invention shown applied to the plow. Fig. 2 is a plan view of the same. Fig. 3 is a transverse sectional view on the line 3 3 of Fig. 1. Fig. 4 is a detail perspective view of the horizontally-adjustable bracket or support. Fig. 5 is a detail perspective view of the pivotally-mounted member which engages the arm of the fender. Fig. 6 is a detail view illustrating a slight modification of the pivoted member.

Like numerals of reference designate corresponding parts in all the figures of the drawings.

1 designates a plow-fender designed to be arranged at one side of a plow, as clearly illustrated in Figs. 1 and 2 of the drawings, and provided with an upwardly-extending arm or bar 2, which is secured at its lower end to the fender and which is adjustably connected at its upper end with the beam 3 of the plow. The fender is interposed between the plow and the plants under cultivation to prevent the latter from being injured by the soil turned over by the plow, and it is designed to be arranged either at the surface of the ground or a suitable distance above the same to permit the desired quantity of soil to pass beneath it to the plants under cultivation. By raising and lowering the fender the quantity of soil passing beneath the same may be readily controlled.

The upper end of the arm or bar 2 is pierced by a bolt 4, which also passes through a pivoted member 5 and through a vertical slot 6 of a vertical portion 7 of a bracket or support 8. The bracket or support 8 is approximately L-shaped and has a horizontal plate or member 9, which is rigid with the upwardly-extending portion or member 7 and which is arranged at right angles to the same. The horizontal portion 9 of the bracket or support extends beneath the plow-beam 3 and is secured to the same by a substantially inverted-U-shaped clip 10, composed of two sides and a connecting top portion. The lower ends of the sides are threaded to receive nuts 11, which engage the lower face of the bottom plate or member 9 of the support or bracket. The bottom plate or member is provided adjacent to the vertical member or portion 7 with a perforation 12 to receive the adjacent side of the clip 10, and the other side of the clip passes through a curved or arcuate slot 13, as clearly shown in Fig. 2 of the drawings. By this construction the bracket or support is pivotally mounted on the plow-beam and is adapted to be adjusted horizontally to swing the fender inwardly or outwardly toward and from the plow.

The pivoted member 5 consists of a disk or plate provided at its inner face with a recess 14, extending across the entire face of the pivoted member 5 and tapered from the periphery toward the center of the same, as clearly shown in Fig. 5 of the drawings. The recess 14 provides opposite shoulders for engaging the arm or bar of the feeder, which is thereby interlocked with the pivoted member 5, and at the same time the said pivoted member 5 permits the fender to have a limited upward movement for enabling it to pass over a stone or other obstruction without injury. The pivoted member 5 is provided at the bottom with a plurality of teeth 15, which are adapted to be engaged by a tooth or projection 16, extending upward from a flange or ledge 17 of the bracket or support, whereby the pivoted member 5 is positively locked against rotary movement on the bolt 4. The slot 6 permits the necessary vertical movement to the plate 5 to engage the teeth 15 with and disengage them from the tooth 16. The teeth 15 form a curved rack, any portion of which is adapted to be engaged by the tooth 16, as will be readily understood. The rack 15 may be omitted and a smooth member 18, such as is illustrated in Fig. 6, may be employed, and when the rack is not used the vertical slot 6 is unnecessary, as the bolt 4 may be passed through a perforation of the vertical portion or member 7 of the bracket or support 8.

The tooth 16 and the rack provide a positive lock for the pivoted member, and when they are not employed it is necessary to clamp the pivoted member tightly against the upright portion 7 of the bracket or support in order to hold the fender firmly in its vertical adjustment. The ledge 17, which extends outward from the bracket or support at the base of the vertical member 7, is formed integral with the said bracket or support and is preferably provided with an upwardly-extending wall or flange 19, which is adapted to increase the strength of the ledge. The ledge has its central portion concavedly curved at its upper face to conform to the configuration of the bottom of the pivoted member.

The means for adjustably connecting the upper end of the inclined arm or bar of the fender to the plow-beam permits the fender to be moved laterally toward and from the plow and also enables the said fender to be raised and lowered. By raising the fender above the surface of the ground a sufficient quantity of soil may be permitted to pass beneath the fender to cover up small blades of grass without injuring the plants under cultivation, and the said fender in this position will also work back the clods to the center of the furrow and prevent the same from being thrown upon the plants.

Having thus fully described my invention, what I claim as new, and desire to secure by Letters Patent, is—

1. A device of the class described, comprising a bracket having a substantially horizontal member, means for pivotally connecting the said member to a plow-beam, a vertically-disposed member pivotally mounted on the bracket, and means for connecting a fender with the pivoted member.

2. A device of the class described, comprising a bracket having upright and horizontal portions, the horizontal portion being provided with an arcuate slot, a clip for securing the bracket to a plow-beam, said clip having one of its sides arranged in the arcuate slot to permit the bracket to have a limited horizontal pivotal movement, and means for pivotally connecting a fender with the upright portion of the bracket.

3. A device of the class described, comprising a bracket having upright and horizontal portions, a clip engaging the horizontal portion of the bracket for securing the latter to a plow-beam, said horizontal portion being pivoted on one side of the clip and having arcuate means for adjustably receiving the other side of the clip, and a pivoted member mounted on the upright portion of the bracket and arranged to receive the arm of a fender.

4. A device of the class described comprising a bracket provided with an arcuate slot, a clip for securing the bracket to a plow, said clip having one of its sides arranged in the arcuate slot to permit the bracket to be adjusted and adapted to secure the bracket in its adjustment, and means mounted on the bracket for connecting a fender with the same.

5. A device of the class described, comprising a bracket, means for securing the same to a plow, and a fender-engaging member pivotally mounted on the bracket, one of the said parts being provided with a tooth and the other having a rack to be engaged by the tooth, whereby the pivoted member is locked in its adjustment.

6. A device of the class described comprising a bracket having an upright portion and provided with an outwardly-projecting ledge, means for mounting the bracket on a plow, a vertical member fitted against the upright portion of the bracket and supported upon the ledge and provided at its inner face at a point above the ledge with an oppositely-tapered recess forming upper and lower shoulders for engaging the arm of a fender, and a fastening device piercing the said member and extending through the upright portion of the bracket and adapted also to pivot the arm of a fender between the said member and the upright portion of the bracket.

7. A device of the class described, comprising a bracket having upright and horizontal portions and provided at the base of the upright portion with an outwardly-extending ledge, said upright portion having a vertical slot, a tooth projecting from the ledge, and an adjustable member fitted against the upright portion of the bracket and having a pivot arranged in the slot of the same, said member being also provided at the bottom with a curved rack arranged to be engaged by the said tooth.

In testimony that I claim the foregoing as my own I have hereto affixed my signature in the presence of two witnesses.

REGINALD R. JONES.

Witnesses:
J. E. DICKERSON,
JULIUS T. LEAS.